(12) United States Patent
Seo

(10) Patent No.: US 12,131,720 B2
(45) Date of Patent: Oct. 29, 2024

(54) TRANSMISSIVE DISPLAY APPARATUS AND IMAGE COMBINING METHOD THEREIN

(71) Applicant: Electronics and Telecommunications Research Institute, Daejeon (KR)

(72) Inventor: Byung Kuk Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 17/990,996

(22) Filed: Nov. 21, 2022

(65) Prior Publication Data

US 2023/0230561 A1 Jul. 20, 2023

(30) Foreign Application Priority Data

Jan. 17, 2022 (KR) .......... 10-2022-0006863

(51) Int. Cl.
G09G 5/377 (2006.01)
G02B 27/01 (2006.01)

(52) U.S. Cl.
CPC .......... G09G 5/377 (2013.01); G02B 27/017 (2013.01); *G02B 2027/0134* (2013.01); *G02B 2027/0138* (2013.01); *G09G 2340/12* (2013.01)

(58) Field of Classification Search
CPC ................................................ G09G 5/377
See application file for complete search history.

(56) References Cited

U.S. PATENT DOCUMENTS

| 9,785,306 | B2 | 10/2017 | Yang et al. |
| 10,878,620 | B2 | 12/2020 | Schwab et al. |
| 10,885,874 | B2 | 1/2021 | Day et al. |
| 2012/0122062 | A1 | 5/2012 | Yang et al. |
| 2015/0061998 | A1* | 3/2015 | Yang .......... G06F 3/04815 345/156 |
| 2015/0213636 | A1 | 7/2015 | Herling et al. |
| 2020/0135141 | A1* | 4/2020 | Day .......... G09G 5/377 |
| 2021/0157398 | A1 | 5/2021 | Ishihara et al. |
| 2022/0197377 | A1* | 6/2022 | Kim .......... G06V 40/18 |

FOREIGN PATENT DOCUMENTS

JP 6394107 9/2018

\* cited by examiner

*Primary Examiner* — Shivang I Patel
(74) *Attorney, Agent, or Firm* — KILE PARK REED & HOUTTEMAN PLLC

(57) ABSTRACT

Provided is a transmissive display apparatus capable of naturally combining a projection image on a real space scene. A beam splitter splits a light incident from a real space scene into first and second portions. An image sensor generates a real space image according to the second portion of the incident light. A light modulator passes at least a part of the first portion of the incident light according to a masking image. A control and projection image generation unit selects a target object and generates the masking image based on a target object area to cause a light modulator to block a foreground of the real space scene and pass a background of the real space scene. A projection unit generates a projection image light corresponding to the projection image combines the projection image light with a part of the first portion of the incident light.

14 Claims, 7 Drawing Sheets

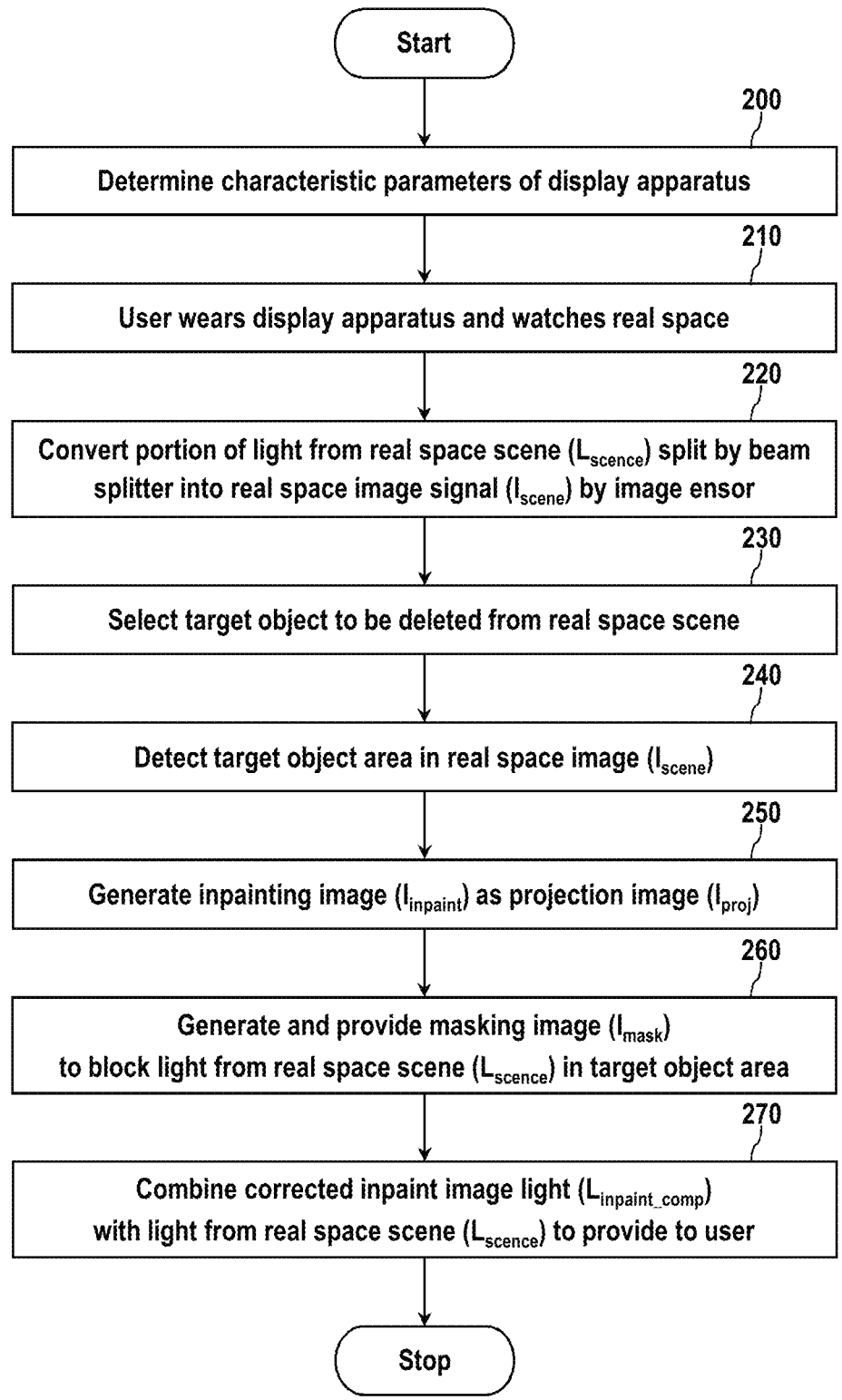

TRANSMISSIVE DISPLAY APPARATUS AND IMAGE COMBINING METHOD THEREIN

CROSS-REFERENCE TO RELATED APPLICATION

The present application claims a convention priority under 35 U.S.C. § 119(a) based on Korean Patent Application No. 10-2022-0006863 filed on Jan. 17, 2022, the entire content of which is incorporated herein in its entirety by reference.

BACKGROUND

1. Technical Field

The present disclosure relates to a display device and, more particularly, to a display device suitable for implementing an augmented reality or diminished reality by combining a projection image on a real space scene. In addition, the present disclosure relates to an image combining method for implementing the diminished reality in the display device.

2. Related Art

Software technologies as well as hardware technologies are rapidly being improved to implement an augmented reality. In particular, a wearable display device having a shape of glasses is attracting more attention than any other mobile devices such as a smartphone as an ideal device for realizing the augmented reality. Several leading information-technology companies have already presented their plans for the development of their own next-generation wearable displays, and concerns of the public for the devices have been increased gradually. A concept of the wearable display of the shape of the glasses is expanding to a general transmissive display apparatus in order to implement a more realistic augmented reality, and various designs and technologies for the optical modules compatible with the expanding concept are being introduced.

Recently, the concept of the augmented reality is expanding to a broader scope. In particular, interactions with the real world is getting more important, and a diminished reality to delete an object from a real space scene is being applied in various fields. However, conventional technologies implementing the augmented reality or diminished reality, which are based on a combination of two types of videos, still need a lot of improvements when one of the objects to be combined is a real world object. In other words, in case that a video object is be combined with a real world scene by a video-based technique, the real world scene needs to be converted into a video before being combined with the video object, which may increase a distortion in a combined image and may cause a loss in a sense of presence that is the most important property of the real world scene. It is difficult to implement a removal of an object from the real world scene in the transmissive display device having the shape of glasses such as a head mounted display.

SUMMARY

Provided is a transmissive display apparatus capable of naturally combining a projection image on a real space scene.

In particular, provided is a transmissive display apparatus capable of easily and naturally implementing a diminished reality that makes a real world object invisible when the projection image is overlaid on the real space scene.

Provided is a method of naturally synthesizing a projection image on a real space scene in a transmissive display apparatus to implement the diminished reality.

According to an aspect of an exemplary embodiment, a display apparatus includes: a beam splitter configured to split a light incident from a real space scene in front of the display apparatus to transmit a first portion of the incident light from the real space scene and reflects a second portion of the incident light from the real space scene; an image sensor configured to generate a real space image according to the second portion of the incident light; a light modulator having a transmittance that is variable for each pixel according to a masking image and configured to pass at least a part of the first portion of the incident light according to the transmittance; a control and projection image generation unit configured to generate the masking image and a projection image according to the real space image; and a projection unit configured to receive the projection image, generate a projection image light corresponding to the projection image, and combine the projection image light with the at least a part of the first portion of the incident light transmitting the light modulator. The control and projection image generation unit selects a target object to be deleted from the real space scene, and generate the masking image based on a target object area associated with the target object so as to cause the light modulator to block a foreground of the real space scene represented by the first portion of the incident light and pass a background of the real space scene.

The projection unit may include a display configured to receive the projection image to generate the projection image light corresponding to the projection image, and a beam combiner configured to combine the projection image light with the at least a part of the first portion of the incident light transmitting the light modulator.

The control and projection image generation unit may include a memory storing program instructions and a processor coupled to the memory and executing the program instructions stored in the memory. The program instructions, when executed by the processor, may cause the processor to: receive the real space image; select a target object; detect a target object area associated with the target object in the real space image; generate the masking image based on the target object area so as to cause the light modulator to block the foreground of the real space scene and pass the background of the real space scene; and generate the projection image based on the real space image to provide the projection image to the projection unit.

The projection image may be an inpainting image generated by removing the target object area from the real space image and filling pixels in the target object area with different pixel values using information on the area around the target object area.

The program instructions causing the processor to generate the projection image may include program instructions causing the processor to correct the inpainting image to reduce a distortion in a combined image.

The program instructions causing the processor to correct the inpainting image may include program instructions causing the processor to: calculate the inpainting image; apply an inverse function of nonlinear color response characteristics of the image sensor to the target object area the inpainting image; apply an attenuation experienced by the incident light from the real space scene in an optical system of the display apparatus; and apply an inverse function of a distortion in the projection unit to the incident light from the real space scene with the attenuation applied to obtain a corrected inpainting image.

The program instructions causing the processor to select the target object may cause the processor to automatically select the target object.

The program instructions causing the processor to select the target object may cause the processor to select the target object in response to a user input.

According to another aspect of an exemplary embodiment, provided is a method of combining a light incident from a real space scene in front of a display apparatus with a projection image light in the display apparatus. The method includes: splitting the incident light from the real space scene to transmit a first portion of the incident light from the real space scene and generate a real space image according to a second portion of the incident light from the real space scene; selecting a target object to be deleted from the real space scene and detecting a target object area associated with the target object; generating a projection image according to the real space image; generating the masking image based on the target object area and blocking a foreground of the real space scene represented by the first portion of the incident light in a path of the incident light from the real space scene according to the masking image while allowing a background of the real space scene to pass; and generating a projection image light corresponding to the projection image and combining the projection image light with a part of the first portion of the incident light in which the foreground is removed.

The projection image may be an inpainting image generated by removing the target object area from the real space image and filling pixels in the target object area with different pixel values using information on the area around the target object area.

The operation of generating projection image may include correcting the inpainting image to reduce a distortion in a combined image.

The operation of correcting the inpainting image may include: calculating the inpainting image; applying an inverse function of nonlinear color response characteristics of the image sensor to the target object area the inpainting image; applying an attenuation experienced by the incident light from the real space scene in an optical system of the display apparatus; and applying an inverse function of a distortion in the projection unit to the incident light from the real space scene with the attenuation applied to obtain a corrected inpainting image.

The target object may be automatically selected by program instructions executed in the display apparatus.

The target object may be selected in response to a user input.

The transmissive display apparatus according to an exemplary embodiment of the present disclosure may naturally combine a projection image on a real space scene. In particular, when the projection image is overlaid on the real space scene, the diminished reality may easily and naturally be implemented to make a real-world object invisible from in the real space scene. Accordingly, the present disclosure allows to provide more intuitive and realistic contents through the deletion of the object in the transmissive display apparatus.

In addition, the exemplary embodiments of the present disclosure enables to implement a more realistic diminished reality having a high sense of presence by utilizing the image inpainting or completion scheme to delete an object area or generate a projection input image.

BRIEF DESCRIPTION OF THE DRAWINGS

In order that the disclosure may be well understood, there will now be described various forms thereof, given by way of example, reference being made to the accompanying drawings, in which:

FIG. 8 is a flowchart showing a method for generating a diminished reality image according to an exemplary embodiment of the present disclosure.

Figure 1:
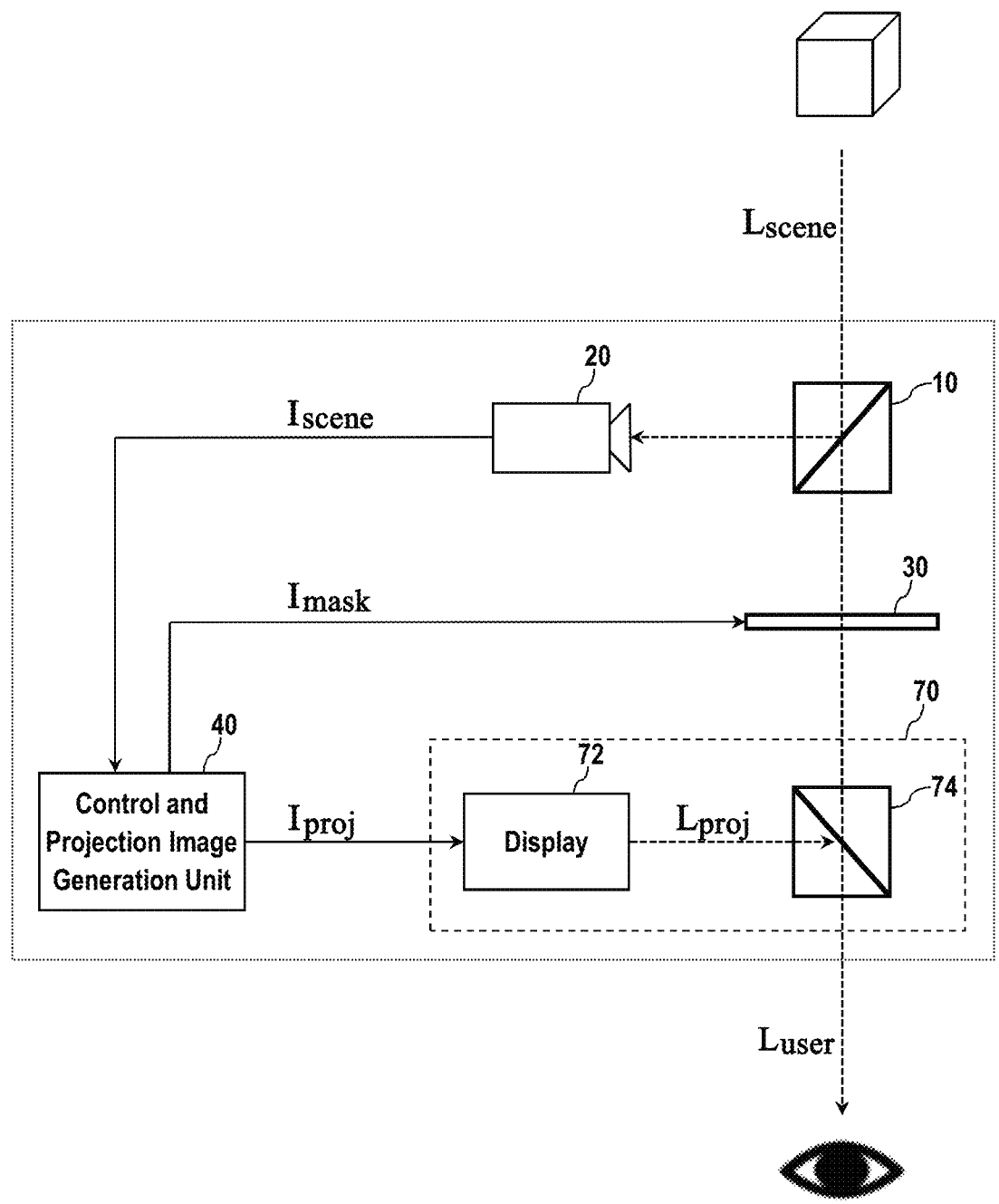
FIG. 1 is a schematic block diagram of a display apparatus according to an exemplary embodiment of the present disclosure.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

FIG. 1 is a schematic block diagram of a display apparatus according to an exemplary embodiment of the present disclosure. The display apparatus shown in the drawing is a transmissive display apparatus having a function of removing one or more real objects in the scene. The display apparatus may be manufactured, for example, in a form of a wearable display such as a head mounted display having a form of glasses, but the present invention is not limited thereto. Thus, the display apparatus may transmit most of the light incident from the real space in the front to visual organs, e.g. eyes, of a user, but may overlap a light associated with a projection image on the incident light to transfer a combined light to the user. In particular, the display apparatus may transfer the combined light to the user such that one or more real objects are removed from the scene by using the projection image overlapped to the original scene. The "projection image" used herein refers to refers to an image overlapped on the real space scene, regardless of whether an amount of information on the real space scene increases as a result of the overlapping or not.

The display apparatus may include abeam splitter 10, an image sensor 20, alight modulator 30, a control and projection image generation unit 40, and a projection unit 70. In an exemplary embodiment, the display apparatus may be configured so that a user can recognize the light with both eyes, and two configurations each identical to that of FIG. 1 may be provided for respective eyes. However, only one eye and one of the configurations corresponding to the eye is described in the drawing and the description for simplicity.

The beam splitter 10 splits the light incident from a front real space (hereinafter, referred to as 'light from the real space scene' and denoted by '$L_{scene}$') to transmit most portion of the light from the real space scene $L_{scene}$ backwards, i.e., toward the eye of the user and reflect a remaining portion of the light from the real space scene $L_{scene}$ toward the image sensor 20. A flat plate-type splitter may be used for the beam splitter 10. However, the shape of the splitter is not limited thereto, and a cube-shaped splitter or other type of splitter may be used as well.

The image sensor 20 may convert the light portion of the light from the real space scene $L_{scene}$ reflected by the beam splitter 10 into an electrical signal to generate a real space image signal $I_{scene}$.

The light modulator 30 has a transmittance changing according to a masking image signal $I_{mask}$ for each pixel so as to transmit the light portion of the light from the real space scene $L_{scene}$ transmitted by the beam splitter 10 according to the transmittance for each pixel. The masking image signal $I_{mask}$ may indicate an individual transmittance for each of the pixels in the light modulator 30. The light modulator 30 may be implemented using, for example, a liquid crystal display (LCD).

The control and projection image generation unit 40 may receive the real space image signal $I_{scene}$ and generate the masking image signal $I_{mask}$. In addition, the control and projection image generation unit 40 may generate a projection image signal $I_{proj}$ to provide to the projection unit 70.

The projection unit 70 may receive the projection image signal $I_{proj}$ and generate a projection image light $L_{proj}$ corresponding to the projection image signal $I_{proj}$. In addition, the projection unit 70 may superimpose and combines the projection image light $L_{proj}$ on the light from the real space scene $L_{scene}$ having passed the beam splitter 10 and the light modulator 30 to emit a combined light as a user-perceivable light $L_{user}$ backwards, i.e., toward the eye of the user.

In the exemplary embodiment, the projection unit 70 may include a display 72 and a beam combiner 74. The display 72 may receive the projection image signal $I_{proj}$ from the control and projection image generation unit 40 and output the projection image light $L_{proj}$ corresponding to the projection image signal $I_{proj}$. The beam combiner 74 may transmit the light from the real space scene $L_{scene}$ having passed the beam splitter 10 and the light modulator 30 and reflect the projection image light $L_{proj}$ from the display 72 toward the eye of the user. Accordingly, the beam combiner 74 may superimpose and combines the projection image light $L_{proj}$ on the light from the real space scene $L_{scene}$ to emit the combined light as the user-perceivable light $L_{user}$ toward the eye of the user.

Figure 2:
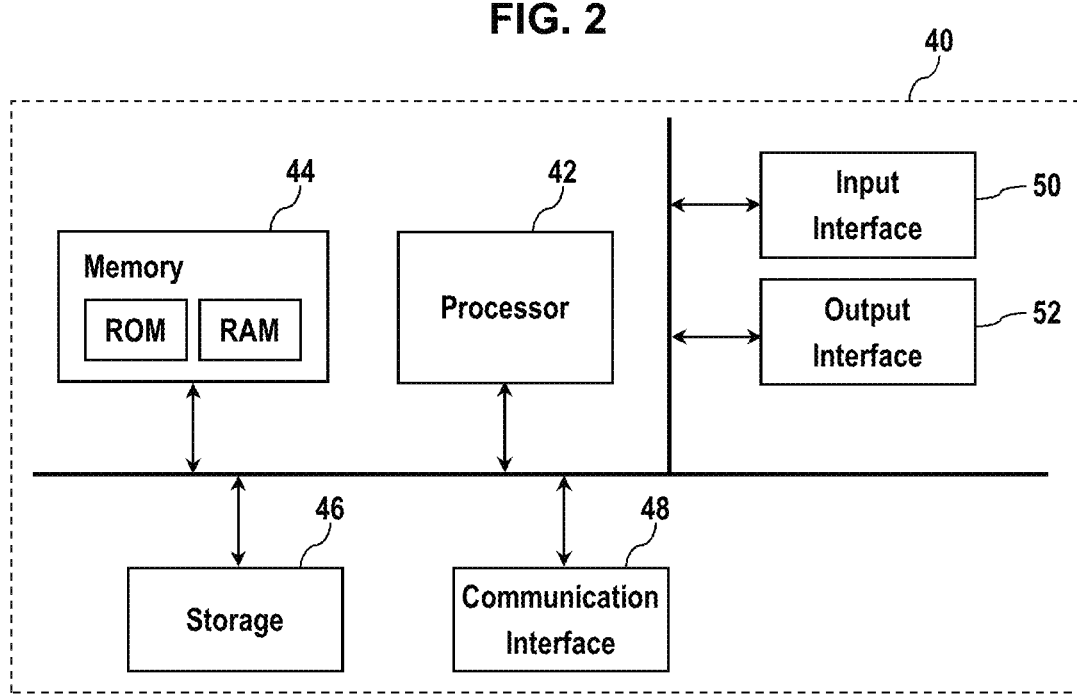
FIG. 2 is a block diagram showing a physical configuration of a control and projection image generation unit according to an exemplary embodiment of the present disclosure.

FIG. 2 is a block diagram showing a physical configuration of the control and projection image generation unit 40 according to an exemplary embodiment of the present disclosure.

The control and projection image generation unit 40 may include at least one processor 42, a memory 44, a communication interface 48, an input interface 50, and an output interface device 52. The control and projection image generation unit 40 may further include a storage device 46. The components of the caricature generating apparatus may be connected to each other by a bus.

The processor 42 may execute program instructions stored in the memory 44 and/or the storage device 46. The processor 42 may include at least one central processing unit (CPU) or a graphics processing unit (GPU), or may be implemented by another kind of dedicated processor suitable for performing the method of the present disclosure.

The memory 44 may include, for example, a volatile memory such as a random access memory (RAM), and a non-volatile memory such as a read only memory (ROM). The memory 44 may load the program instructions stored therein or the program instructions stored in the storage device 46 to the processor 520 so that the processor 42 may execute the program instructions. The storage device 46 may be a recording medium suitable for storing the program instructions and data, and may include, for example, a flash memory, an erasable programmable ROM (EPROM), or a semiconductor memory such as a solid-state drive (SSD) manufactured therefrom.

The program instructions, when executed by the processor 42, may cause the processor 42 to receive the real space image, select a target object, detect a target object area associated with the target object in the real space image, generate the masking image based on the target object area so as to cause the light modulator to block the foreground of the real space scene and pass the background of the real space scene, and generate the projection image based on the real space image to provide the projection image to the projection unit.

The communication interface 48 enables the control and projection image generation unit 40 to communicate with an external device and may include an Ethernet interface, a WiFi interface, a Bluetooth interface, an RF interface for allowing communications according to a certain wireless protocol such as a 4G LTE, 5G NR, or 6G communication protocol, or another interface. The input interface 50 enables the user to input operation commands or information. In addition, the input interface 50 may receive the real space image signal $I_{scene}$ from the image sensor 20 to provide to the processor 42. The input interface 50 may include at least one button or a touch sensor. The output interface 52 may display an operating state or guide information of the display apparatus. In addition, the output interface 52 may supply the masking image signal $I_{mask}$ and the projection image signal $I_{proj}$ to the light modulator 30 and the projection unit 70, respectively. The input interface 50 and the output interface 52 may allow one or more cameras or another other external device to be connected to the control and projection image generation unit 40 as described below.

In an exemplary embodiment, the control and projection image generation unit 40 may be a data processing device such as a personal computer (PC) and a smartphone. The control and projection image generation unit 40 may be configured in a compact form based on an embedded CPU.

Figure 3:
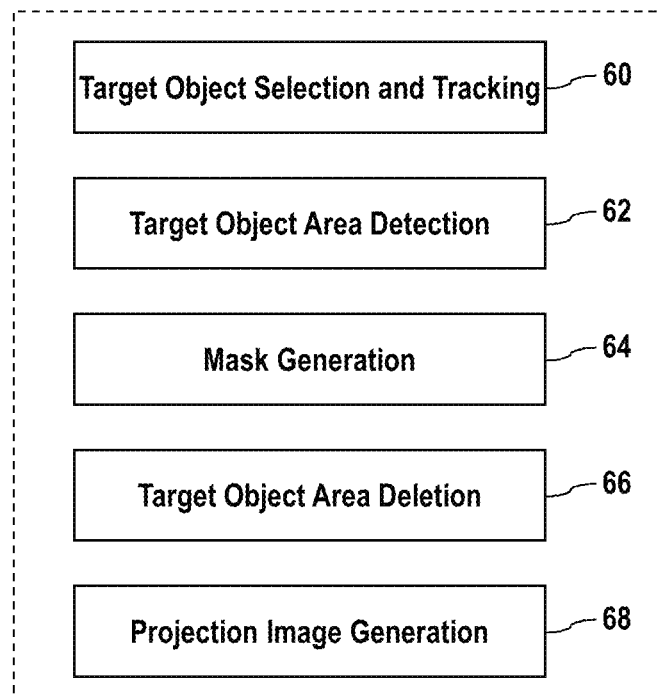
FIG. 3 is a functional block diagram of a program executed by a processor in the control and projection image generation unit shown in FIG. 2.

FIG. 3 is a functional block diagram of an image processing program executed by the processor 42 in the control and projection image generation unit 40 shown in FIG. 2. The image processing program may include a target object selection and tracking module 60, a target object area detection module 62, a mask generation module 64, a target object area deletion module 66, and a projection image generation module 68.

The target object selection and tracking module 60 may select a target object to be deleted from the real space scene. In an exemplary embodiment, the target object selection and tracking module 60 may automatically select the target object that meets a certain requirement in the real space image $I_{scene}$. In an exemplary embodiment, the target object selection and tracking module 60 may include an artificial neural network trained to select the target object. Alternatively, however, the target object selection and tracking module 60 may select the target object in response to a user input. That is, the target object selection and tracking module 60 may select the target object in the real space image $I_{scene}$ according to a detection of a button input, a touch screen input, or a gesture of the user. Once the target object is selected, the target object selection and tracking module 60 may track the target object in frame sequences of the real space image $I_{scene}$ until the target setting is released.

The target object area detection module 62 may detects a target object area occupied by the target object in the real space image $I_{scene}$. As described above, the target object may be automatically detected by program instructions or may be manually specified by the user. The user may select the target object to be deleted from the real space image through the input interface 50. The target object area includes all pixels belonging to the selected target object. The target object area may be detected by a known method based on at least one of pixel values of pixels around the target object, edges of the objects, textures of the objects.

The mask generation module 64 may generate the masking image $I_{mask}$, based on target object area information from the target object area detection module 62, that controls the transmittance of the light modulator 30 so that the light modulator 30 may block the light from the real space scene $L_{scene}$ for a target object area. The transmittance of the light modulator 30 may be set independently for each pixel according to the masking image $I_{mask}$. For example, in case that the light from the real space scene $L_{scene}$ is to be transmitted to the user with the target object area blocked, the masking image $I_{mask}$ may be configured such that the transmittance of the light modulator 30 may be 0% at pixels belonging to the target object area while the transmittance may have a value of 100% at pixels belonging to a background area other than the target object area.

The target object area deletion module 66 may delete the target object area from the real space image $I_{scene}$ received from the image sensor 20. The deletion of the target object area may be performed for a substitution of the target object area in the real space image $I_{scene}$ with the projection image $I_{proj}$ in the target object area. The projection image $I_{proj}$ for the target object area may be used to generate the projection image light $L_{proj}$, which is to be superimposed with the light from the real space scene $L_{scene}$ from which the portion for the target object area has been excluded. Meanwhile, the mask generation module 64 may construct the masking image $I_{mask}$ based on the real space scene $I_{scene}$ from which the target object area has been removed by the target object area deletion module 66 instead of the target object area information from the target object area detection module 62.

The projection image generation module 68 may generate the projection image $I_{proj}$ for generating the projection image light $L_{proj}$ to be superimposed on the light from the real space scene $L_{scene}$ passing through the beam splitter 10 and the light modulator 30. In particular, when transmitting the light from the real space scene $L_{scene}$ to the user in a state that the portion of the target object area has been removed, the projection image generation module 68 may generate an inpainting image $I_{inpaint}$ by filling each pixel of the target object area with a different pixel value using information on the pixels around the target object area in the real space scene $L_{scene}$ from which the target object area has been deleted. The projection image generation module 68 may output the inpainting image $I_{inpaint}$ to the projection unit 70 as the projection image $I_{proj}$. Further, the projection image generation module 68 may correct the inpainting image $I_{inpaint}$ and output a corrected inpainting image $I_{inpaint\_comp}$ to reduce a distortion in the superimposed image.

An operation of the display apparatus according to an exemplary embodiment of the present invention will now be described in more detail.

Modeling and Determination of Parameters

First, a mathematical model for the display apparatus and a parameter determination method according to an exemplary embodiment will be described.

In the display apparatus shown in FIG. 1, the user-perceivable light $L_{user}$ which is finally visible to the eyes of the user eyes through an optical system including the beam splitter 10, the light modulator 30, and the beam combiner 74 may be expressed by Equation 1 in a form including terms of the light from the real space scene $L_{scene}$ and the projection image light $L_{proj}$ generated by the projection unit 70. Here, it is assumed that the optical components are well aligned optically in advance.

$$L_{user} = \alpha L_{scene} + \beta L_{proj} \qquad \text{[Equation 1]}$$
$$= d(L_{scene}) \circ T_{lm}(I_{mask}) + R_{om}(I_{proj})$$

where '$\alpha$' and '$\beta$' denote weights, and a small circle ($\circ$) indicates a pixelwise multiplication operator. 'd( )' represents the degree of attenuation that the light from the real space scene $L_{scene}$ experiences in the optical system and may be different for each pixel. '$T_{lm}( )$' is the transmittance of the light modulator 30 and may vary according to a control signal, i.e., the masking image signal $I_{mask}$. '$R_{om}( )$' represents the degree of distortion that the projection image signal $I_{proj}$ suffers in the process of being converted into light by the display 72 and reflected by the beam combiner 74 in the projection unit 70.

Accordingly, once the attenuation d( ) in the optical system, the transmittance $T_{lm}( )$ of the light modulator 30, and the degree of distortion $R_{om}( )$ in the projection unit 70 are determined, the user-perceivable light $L_{user}$ may be calculated by Equation 1.

In an exemplary embodiment, a camera radiometric calibration, for example, may be performed before the display apparatus is assembled to estimate the attenuation d( ), the transmittance $T_{lm}( )$, and the degree of distortion $R_{om}( )$. In general, when a light entering the camera is converted to an electrical signal representing an intensity of the image, the signal is distorted by nonlinear color response characteristics, gcam, of the camera. The camera radiometric calibration refers to a process of estimating the nonlinear color response characteristics by a linear model, for example, and applying an inverse function of the nonlinear color response characteristics to the image signal. However, the method of determining the attenuation d( ), the transmittance $T_{lm}( )$, and the degree of distortion $R_{om}( )$ is not limited to the camera radiometric calibration.

Figure 4:
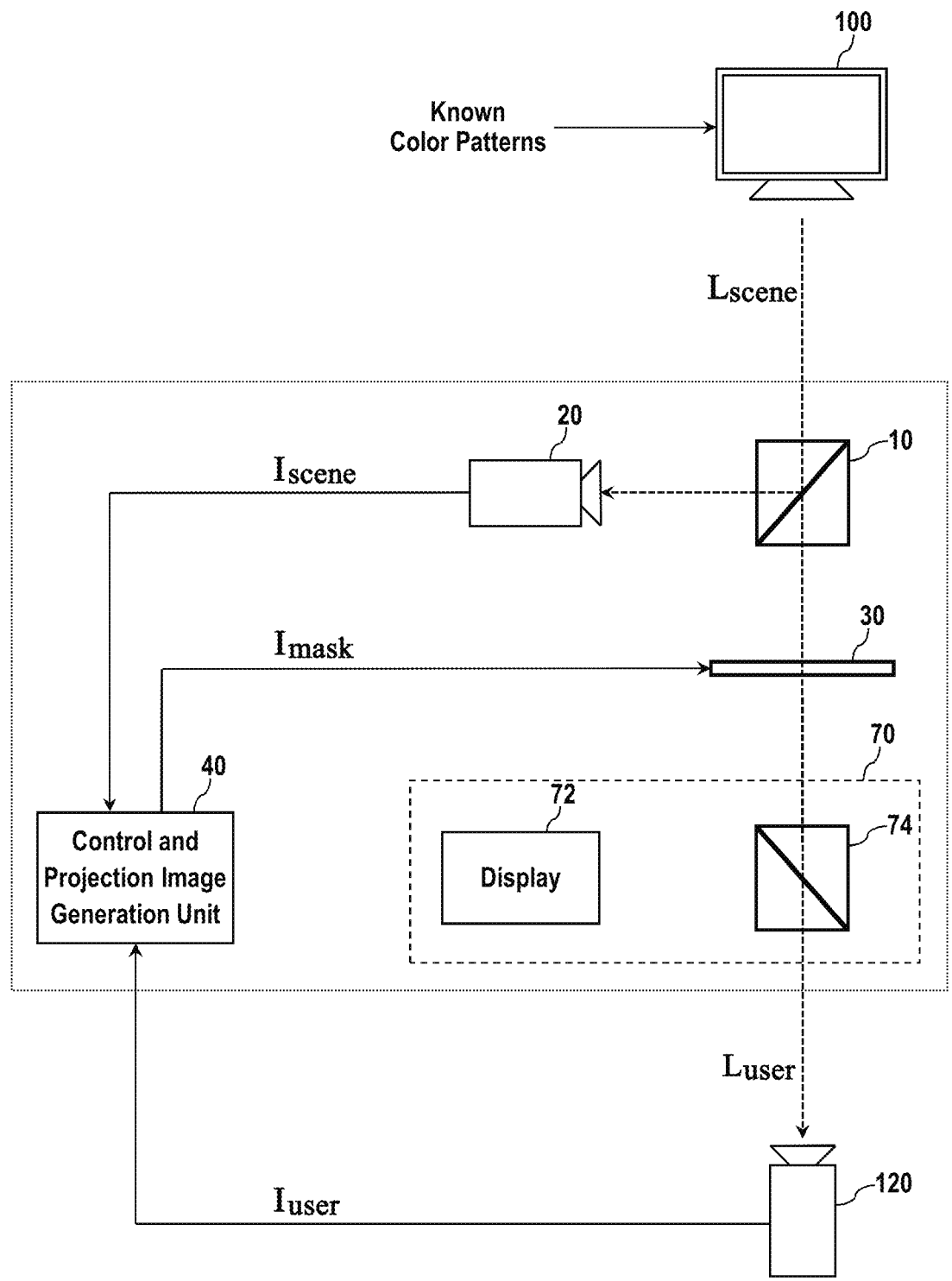
FIG. 4 illustrates an example of an arrangement of members for estimating an attenuation in an optical system of the display apparatus shown in FIG. 1.

FIG. 4 illustrates an example of an arrangement of the members for estimating the attenuation d( ) in the optical system of the display apparatus. The estimation of the attenuation d( ) may be carried out as follows. A monitor 100 is placed in front of the beam splitter 10, and a second camera 120 is installed at the position of the eye of the user. The projection unit 70 is set to pass all incident light, and the projection unit 70 is set such that no projection image light $L_{proj}$ is projected. In this state, a known color pattern image is displayed on the monitor 100, and the user-perceivable light $L_{user}$ having passed through the light modulator 30 and the beam combiner 74 is captured by the second camera 120.

The attenuation d( ) may be estimated based on the image displayed on the monitor 100 and the user-perceivable light $L_{user}$ captured by the second camera 120. In detail, Equation 1 may be changed into a form of Equation 2 in this case.

$$L_{user} = \alpha L_{scene} + \beta L_{proj} \qquad \text{[Equation 2]}$$
$$= d(L_{scene}) \circ T_{lm}(I_{mask}) + R_{om}(I_{proj})$$
$$= d(L_{scene})$$

That is, since the projection image signal $I_{proj}$ and the projection image light $L_{proj}$ are not generated in the projection unit 70, the representation of the user-perceivable light $L_{user}$ may be simplified as in Equation 2. In case that the color response characteristics, gcam, (i.e., color image intensity characteristics with respect to scene radiances) of the first camera (i.e., the image sensor) 20 and the second camera 120 are already known, Equation 2 may be modified into Equation 3 to express the user-perceivable light $L_{user}$ using an inverse function, $gcam^{-1}$, of the color response characteristics, gcam.

$$L_{user} = d(L_{scene})$$
$$g_{cam2}^{-1}(I_{user}) = d(g_{cam1}^{-1}(I_{scene})) \qquad \text{[Equation 3]}$$

As can be seen in Equation 3, the attenuation d( ) may be determined by estimating the user-perceivable light $L_{user}$ based on the image signal $I_{user}$ detected by the second camera 120 and the color response characteristics, gcam2, of the second camera 120, estimating the light from the real space scene $L_{scene}$ based on the image signal $I_{scene}$ detected by the first camera 20 and the color response characteristics, gcam, of the first camera 20, and calculating pixelwise ratios of the intensities of the two image signals, i.e., ($g_{cam2}^{-1}(I_{user})$) and ($g_{cam1}^{-1}(I_{scene})$).

Figure 5:
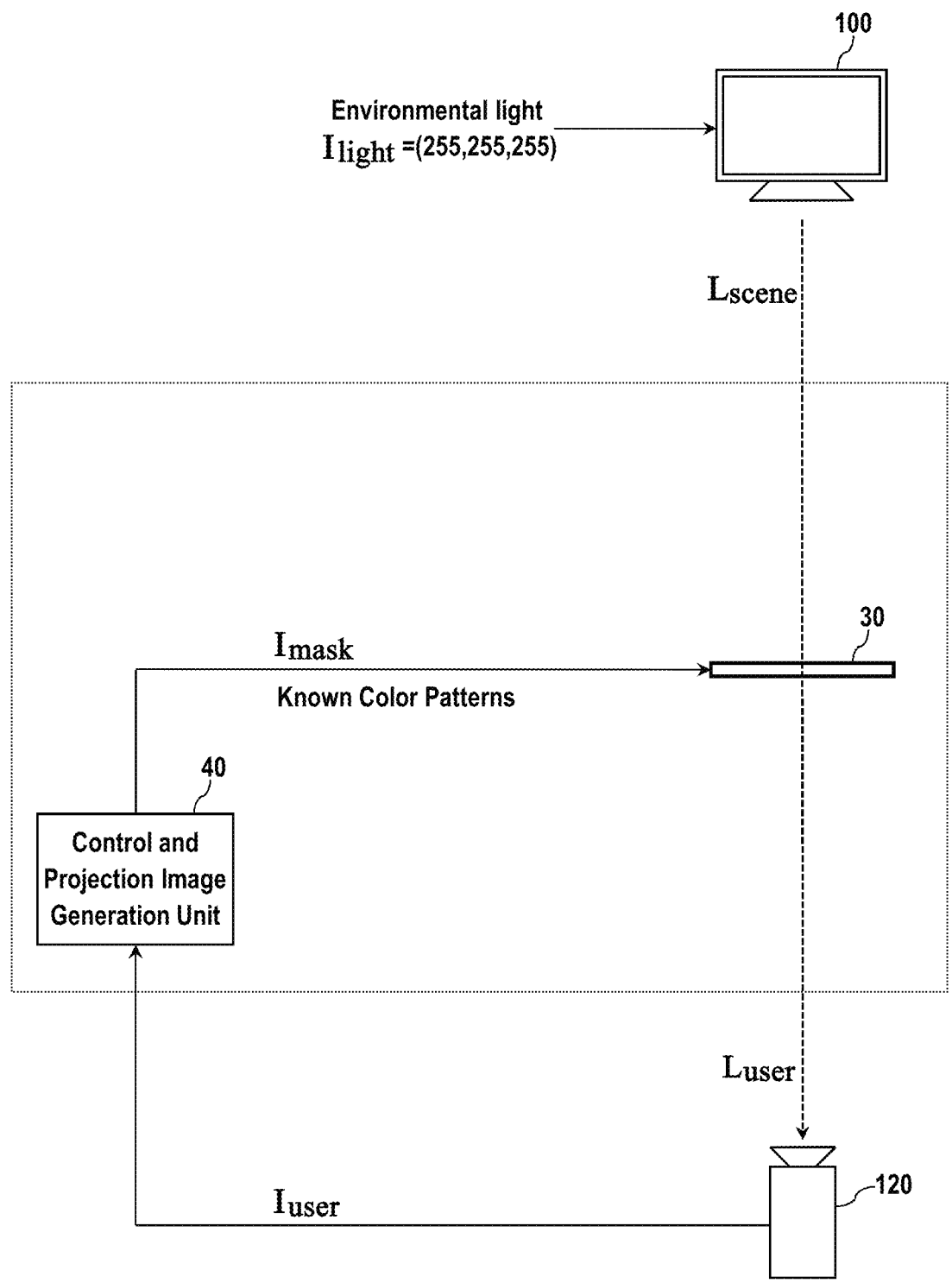
FIG. 5 illustrates an example of an arrangement of members for estimating a transmittance of a light modulator shown in FIG. 1.

FIG. 5 illustrates an example of an arrangement of the members for estimating the transmittance $T_{lm}( )$ of the light modulator 30. The estimation of the transmittance $T_{lm}( )$ may be done as follows. The monitor 100 is placed in front of the display apparatus, and the second camera 120 is installed at the position of the eye of the user. The beam splitter 10 and the beam combiner 74 may not be installed or may be removed temporarily. In this state, an ambient light, for example, a white image in which all pixels are white may be output on the monitor 100, and a masking image signal $I_{mask}$ representing a known color pattern image is supplied to the light modulator 30. Then, the user-perceivable light $L_{user}$ output by the light modulator 30 is captured by the second camera 120.

The transmittance $T_{lm}( )$ may be estimated based on the image displayed on the monitor 100 and the user-perceivable light $L_{user}$ captured by the second camera 120. In detail, Equation 1 may be changed into a form of Equation 4 in this case.

$$L_{user} = \alpha L_{scene} + \beta L_{proj} \qquad \text{[Equation 4]}$$
$$= d(L_{scene}) \circ T_{lm}(I_{mask}) + R_{om}(I_{proj})$$
$$= T_{lm}(I_{mask})$$

That is, since the projection image signal $I_{proj}$ and the projection image light $L_{proj}$ are not generated in the projection unit 70 and the white light is used as the light from the real space scene $L_{scene}$, the representation of the user-perceivable light $L_{user}$ may be simplified as in Equation 4. In case that the color response characteristics, gcam, of the second camera 120 is already known, Equation 4 may be modified into Equation 5 to express the user-perceivable light $L_{user}$ using an inverse function, $gcam2^{-1}$, of the color response characteristics of the second camera 120.

$$L_{user}=T_{lm}(I_{mask})$$

$$g_{cam2}^{-1}(I_{user})=T_{lm}(I_{mask}) \quad \text{[Equation 5]}$$

As can be seen in Equation 5, the transmittance $T_{lm}(\ )$ may be determined by estimating the user-perceivable light $L_{user}$ based on the image signal $I_{user}$ detected by the second camera 120 and the color response characteristics, gcam2, of the second camera 120 and calculating pixelwise ratios of the intensities of the two image signals, i.e., $(g_{cam2}^{-1}(I_{user}))$ and $L_{mask}$ containing the known color pattern.

Figure 6:
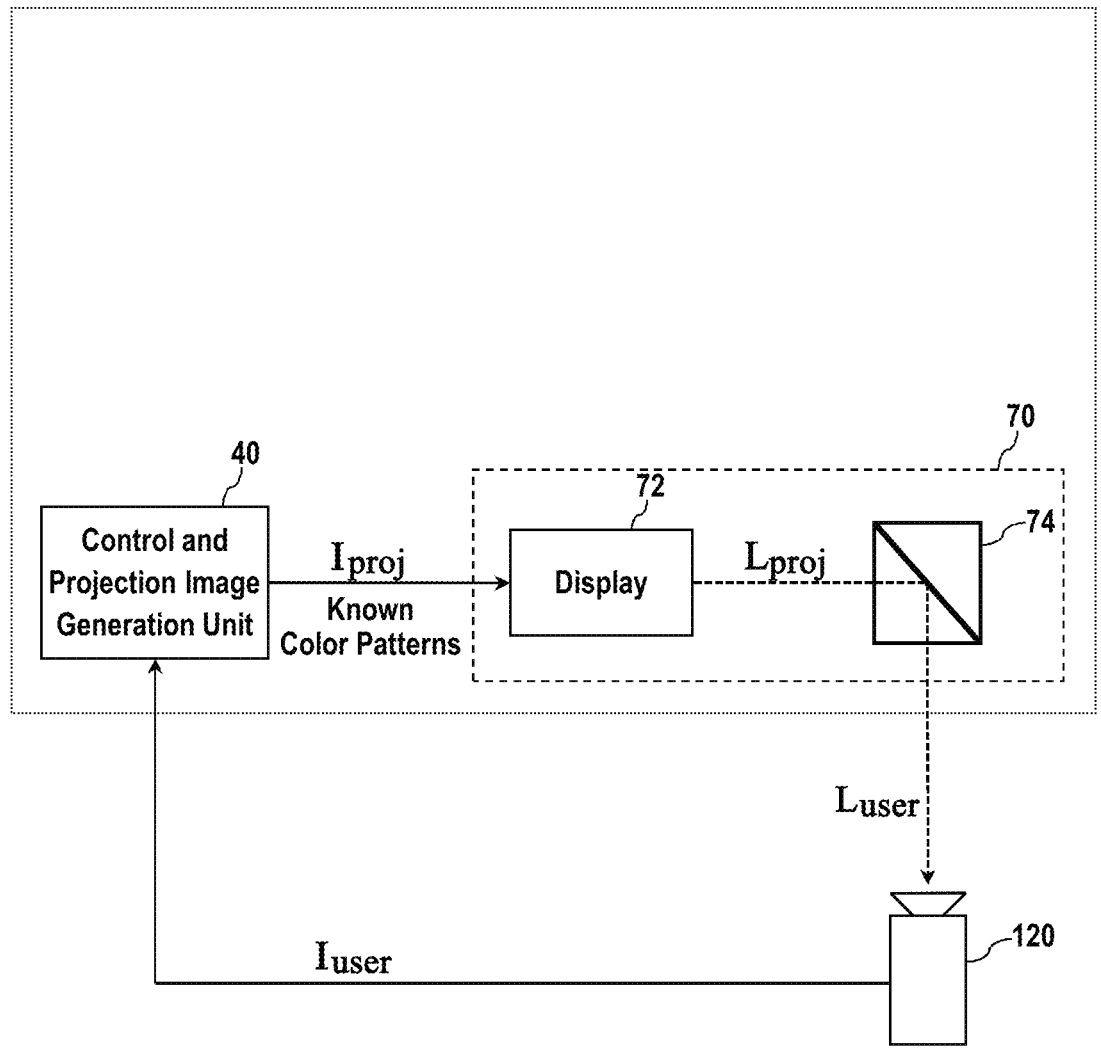
FIG. 6 illustrates an example of an arrangement of members for estimating a degree of distortion in a projection unit shown in FIG. 1.

FIG. 6 illustrates an example of an arrangement of the members for estimating the degree of distortion $R_{om}(\ )$ in the projection unit 70. The estimation of the degree of distortion $R_{om}(\ )$ may be done as follows. The second camera 120 is installed at the position of the eye of the user. In such a state, a projection image signal $I_{proj}$ representing a known color pattern image is supplied to the projection unit 70 while any light from the real space scene $L_{scene}$ is not incident on the display device. As a result, the projection image light $L_{proj}$ corresponding to the projection image signal $I_{proj}$ is generated by the display 72. Then, the user-perceivable light $L_{user}$ output by the beam combiner 74 captured by the second camera 120.

The degree of distortion $R_{om}(\ )$ may be estimated based on the projection image light $L_{proj}$ and the user-perceivable light $L_{user}$ captured by the second camera 120. In detail, Equation 1 may be changed into a form of Equation 6 in this case.

$$L_{user} = \alpha L_{scene} + \beta L_{proj} \quad \text{[Equation 6]}$$
$$= d(L_{scene}) \circ T_{lm}(I_{mask}) + R_{om}(I_{proj})$$
$$= R_{om}(I_{proj})$$

That is, since no light from the real space scene $L_{scene}$ is incident on the display device, the representation of the user-perceivable light $L_{user}$ may be simplified as in Equation 6. In case that the color response characteristics, gcam2, of the second camera 120 is already known, Equation 6 may be modified into Equation 7 to express the user-perceivable light $L_{user}$ using the inverse function, $gcam2^{-1}$, of the color response characteristics of the second camera 120.

$$L_{user}=R_{om}(I_{proj})$$

$$g_{cam2}^{-1}(I_{user})=R_{om}(I_{proj}) \quad \text{[Equation 7]}$$

As can be seen in Equation 7, the degree of distortion $R_{om}(\ )$ in the projection unit 70 may be determined by estimating the user-perceivable light $L_{user}$ based on the image signal $I_{user}$ detected by the second camera 120 and the color response characteristics, gcam2, of the second camera 120 and calculating pixelwise ratios of the intensities of the two image signals, i.e., $(g_{cam2}^{-1}(I_{user}))$ and $I_{proj}$ containing the known color pattern.

In the process of estimating the attenuation $d(\ )$ in the optical system, the transmittance $T_{lm}(\ )$ of the light modulator 30, and the degree of distortion $R_{om}(\ )$ in the projection unit 70, it is assumed that the output of the display apparatus is calibrated in advance before the light from the real space scene $L_{scene}$, the masking image signal $I_{mask}$, or the projection image signal $I_{proj}$ is applied to the display apparatus. Further, each of the functions used for the estimations may be calculated and determined only once in advance to be used as uniform functions while the optical system is maintained.

Generation of Projection Image with Target Object Removed

As described above, the projection image signal $I_{proj}$ representing the projection image light $L_{proj}$ to be combined with the light from the real space scene $L_{scene}$ is generated by the control and projection image generation unit 40. Further, the projection unit 70 may generate the projection image light $L_{proj}$ corresponding to the projection image signal $I_{proj}$. Among the various types of projection images, an image generated by removing the target object area from the real space image $I_{scene}$ and filling pixels in the target object area with different pixel values using information on the area around the target object area is referred to as an 'inpainting image' herein. In addition, an image signal representing the inpainting image $I_{inpaint}$ will be referred to as an 'inpainting image signal'. Further, the indication '$I_{inpaint}$' will be used herein to denote both the inpainting image and the inpainting image signal similarly to the other images and signals. The inpainting image $I_{inpaint}$ is a kind of the projection images generated by the control and projection image generation unit 40.

Unlike another kind of display apparatus which is capable of completely removing a portion of an image, it is difficult to completely substitute a portion of an image with another one in the transmissive display apparatus. That is, when the projection image light $L_{proj}$ corresponding to the projection image $I_{proj}$ such as the inpainting image $I_{inpaint}$ is simply overlapped to the light from the real space scene $L_{scene}$, the target object area to be removed from the light from the real space scene $L_{scene}$ may remain in the light from the real space scene $L_{scene}$ after the overlapping, which may result in a distortion of information and cause a confusion to the user.

To solve such a problem, in an exemplary embodiment of the present invention, a foreground portion $L_{scene\_fg}$ corresponding to the target object area in the light from the real space scene $L_{scene}$ is blocked by the light modulator 30, and only a background portion $L_{scene\_bg}$ is left in the light from the real space scene $L_{scene}$. Afterwards, an inpainting image light $L_{inpaint}$ is overlapped with the background portion $L_{scene\_bg}$ of the real space scene $L_{scene}$.

In this regard, Equation 1 may be rearranged by dividing it into a foreground part and a background part as shown in Equation 8.

$$L_{user\_fg}=d(L_{scene\_fg}) \circ T_{lm}(0)+R_{om}(I_{inpaint\_fg})=R_{om}(I_{inpaint\_fg})$$

$$L_{user\_bg}=d(L_{scene\_bg}) \circ T_{lm}(255)+R_{om}(0)=d(L_{scene\_bg}) \quad \text{[Equation 8]}$$

Figure 7:
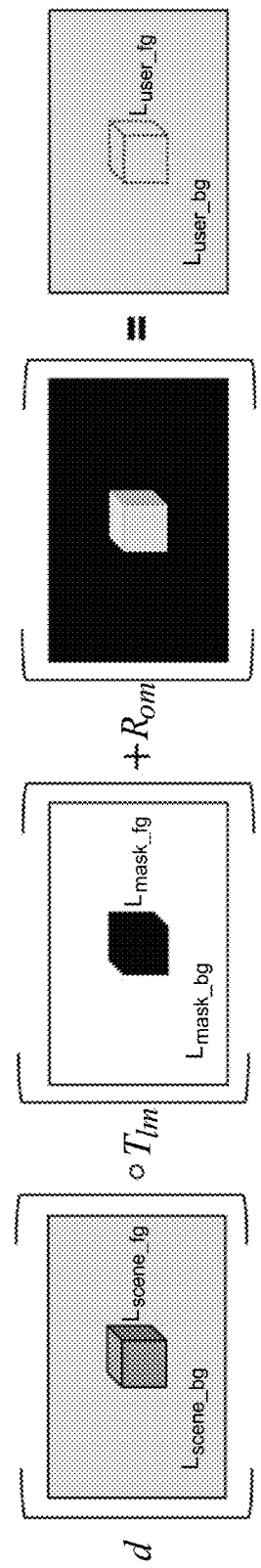
FIG. 7 illustrates an example of image portions formed during a course of generating a diminished reality image according to an exemplary embodiment of the present disclosure.

FIG. 7 illustrates an example of the terms corresponding to the foreground portions and the background portions of the light from the real space scene $L_{scene}$, the inpainting image light $L_{inpaint}$, and the user-perceivable light $L_{user}$ included in Equation 8.

Referring to Equations 1 and 8 and FIG. 7, the light from the real space scene $L_{scene}$ may include the foreground portion $L_{scene\_fg}$ corresponding to the target object area and the background portion $L_{scene\_bg}$ other than the foreground portion $L_{scene\_fg}$ in the light from the real space scene $L_{scene}$. The masking image signal or the masking image $I_{mask}$ applied to the light modulator 30 has a transmittance of 0% in the foreground portion $L_{mask\_fg}$ so as to completely block the light from the real space scene $L_{scene}$ for the foreground portion. On the other hand, masking image signal $I_{mask}$ applied to the light modulator 30 has a transmittance of 100% in the background portion $L_{mask\_bg}$ so as to completely pass the light from the real space scene $L_{scene}$ for the background portion. Accordingly, the light modulator 30 completely blocks the light from the real space scene $L_{scene}$ in the target object area while allow the light to pass in the background area.

In the foreground portion $L_{inpaint\_fg}$ of the inpainting image generated by the control and projection image generation unit 40, the target object area is removed from the real space image $I_{scene}$ and the pixels in the target object area are filled with different pixel values using the information on the area around the target object area. On the other hand, all pixels in the background portion $L_{inpaint\_bg}$ of the inpainting image may have values of zero.

The user-perceivable light $L_{user}$ is a sum of the portion of light from the real space scene $L_{scene}$ transmitting the light modulator 30 and the inpainting image light $L_{inpaint}$, i.e., $R_{om}(I_{inpaint\_fg})$. Accordingly, the foreground portion $L_{user\_fg}$ of the user-perceivable light $L_{user}$ is the same as the foreground portion $L_{inpaint\_fg}$ of the inpainting image since the light from the real space scene $L_{scene}$ is blocked due to the masking of the light modulator 30 and is not included in that portion. Meanwhile, the background portion $L_{user\_bg}$ of the user-perceivable light $L_{user}$ is almost the same as background portion of the light from the real space scene $L_{scene}$ possibly with some deviation due to the unideal factors related with the attenuation, transmittance, and distortion described above, and the component of the inpainting image light $L_{inpaint}$ is not included in that portion.

Since the generation of the inpainting image light $L_{inpaint}$ may involve the deletion of the target object area using the information on the target object area itself as well as the information on the pixels around the target object, the component $R_{om}(I_{inpaint})$ of the inpainting image $I_{inpaint}$ in the user-perceivable light $L_{user}$ may be expressed by Equation 9.

$$R_{om}(I_{inpaint})=R_{om}(I_{proj}) \leftarrow I_{scene}=g_{cam}(L_{scene}) \quad \text{[Equation 9]}$$

where gcam denotes the color response characteristics of the image sensor 20.

However, even when the inpainting image is generated in the manner described above, the user-perceivable light $L_{user}$ from which the target object is actually removed is different from an image in which the target object have not existed from the beginning. That is, when the inpainting image light $L_{inpaint}$ from which the target object is removed is projected through the beam combiner 74, the distortion may be inevitable unless the deleted object is a white object. It is similar to a case, for example, that colors or color patterns of a projected image projected on a wall may vary according to the color or color pattern of the wall unless the wall is colored in white. In an exemplary embodiment, the inpainting image light $L_{inpaint}$ used for generating the inpainting image light $L_{inpaint}$ to be projected to the beam combiner 74 may be corrected to solve the above problem. A corrected inpainting image foreground portion $I_{inpaint\_fg\_comp}$ may be obtained through Equation 10 through 12.

If it is assumed that the target object is actually deleted, the user-perceivable light foreground portion $L_{user\_fg\_diminish}$ may be expressed by Equation 10 from Equation 8.

$$L_{user\_fg\_diminish} = d(L_{scene\_fg\_diminish}) \circ T_{lm}(255) + R_{om}(0) \quad \text{[Equation 10]}$$
$$= d(L_{scene\_fg\_diminish})$$

Ideally, the foreground portion $L_{user\_fg}$ of the user-perceivable light $L_{user}$ in Equation 8 is to be the same as the user-perceivable light foreground portion $L_{user\_fg\_diminish}$ in Equation 10. Accordingly, the corrected inpainting image foreground portion $I_{inpaint\_fg\_comp}$ may be expressed by Equation 11.

$$R_{om}(I_{inpaint\_fg\_comp})=d(L_{scene\_fg\_diminish})$$
$$I_{inpaint\_fg\_comp}=R_{om}^{-1}(d(L_{scene\_fg\_diminish})) \quad \text{[Equation 11]}$$

Taking Equation 9 into account, the corrected inpainting image foreground portion $I_{inpaint\_fg\_comp}$ may be expressed by Equation 12.

$$I_{inpaint\_fg\_comp} = R_{om}^{-1}(d(L_{scene\_fg\_diminish})) \quad \text{[Equation 12]}$$
$$= R_{om}^{-1}(d(g_{cam}^{-1}(I_{inpaint\_fg})))$$

That is, the corrected inpainting image foreground portion $I_{inpaint\_fg\_comp}$ may be derived by removing the target object area from the real space image $I_{scene}$, filling the pixels in the target object area with different pixel values using information on the area around the target object area to acquire the inpainting image $I_{inpaint}$, applying an inverse function of the nonlinear color response characteristics of the image sensor 20 to the foreground portion $I_{inpaint\_fg}$ of the inpainting image $I_{inpaint}$, applying the attenuation d( ) in the optical system, and applying an inverse function of the distortion $R_{om}( )$ in the projection unit 70.

Process of Generating Diminished Reality Image

FIG. 8 is a flowchart showing a method for generating a diminished reality image according to an exemplary embodiment of the present disclosure.

First, parameters indicating the characteristics of the display apparatus are determined (operation 200). The parameters may include the attenuation d( ) in the optical system, the transmittance $T_{lm}( )$ of the light modulator 30, the degree of distortion $R_{om}( )$ in the projection unit 70, and the color response characteristics gcam of the image sensor 20.

If the user wears the display apparatus having the shape of the glasses, for example, and watches the real space (operation 210), the light from the real space scene $L_{scene}$ is incident on the beam splitter 10. A portion of the light from the real space scene $L_{scene}$ is reflected by the beam splitter 10 to be split and incident on the image sensor 20. The portion of the light from the real space scene $L_{scene}$ split by the beam splitter 10 is converted into real space image signal $I_{scene}$ which is an electrical signal by the image sensor 20 (operation 220).

Afterwards, a target object to be deleted from the real space scene $L_{scene}$ may be selected (operation 230). In an exemplary embodiment, the target object may be selected by a program executed in the control and projection image generation unit 40. In an exemplary embodiment, the program may include a trained artificial neural network. Alternatively, however, the target object may be manually selected by the user. The user may select the target object in the real space scene by manipulating a button or a touch switch provided as the input interface 50 or by utilizing a gesture sensing function provided by the display apparatus.

After the target object is determined, the target object area including all pixels associated with the target object in the real space image $I_{scene}$ from the image sensor 20 may be detected (operation 240). In addition, once the target object is selected, the target may be traced until the target setting is released. As the position of the target object in the real space scene varies due to a translational movement or rotation of the display apparatus or a movement of the target object, the position and size of the target object area may be continuously updated by the tracking function.

Subsequently, the projection image $I_{proj}$ for forming the projection image light $L_{proj}$ to be combined with the light from the real space scene $L_{scene}$ may be generated (operation 250). The projection image $I_{proj}$ may have various forms. One example of the projection image $I_{proj}$ may be the inpainting image $I_{inpaint}$ which may be formed by removing the target object area from the real space image $I_{scene}$ and filling pixels in the target object area with different pixel values using information on the area around the target object area. Such an inpainting image $I_{inpaint}$ may be used in diminished reality applications. Further, in order to reduce the distortion of the combined image, the inpainting image $I_{inpaint}$ may be corrected to yield the corrected inpainting image $I_{inpaint\_comp}$ as the projection image $I_{proj}$.

After the projection image $I_{proj}$ is generated, the masking image $I_{mask}$ may be generated based on the target object area detected in the operation 240 and provided to the light modulator 30 (operation 260). Accordingly, the light modulator 30 may completely block the light from the real space scene $L_{scene}$ to pass only the background area portion in the target object area. In addition, the display apparatus may combine the corrected inpainting image light $L_{inpaint\_comp}$ with the light from the real space scene $L_{scene}$ having passed the beam splitter 10 and the light modulator 30 to output the combined light as the user-perceivable light $L_{user}$ to the user (operation 270). Accordingly, a diminished reality image light which is similar to the real space scene $L_{scene}$ except that the target object area is removed may be perceived by the eye of the user.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A display apparatus, comprising:
a beam splitter configured to split a light incident from a real space scene in front of the display apparatus to transmit a first portion of the incident light from the real space scene and reflects a second portion of the incident light from the real space scene;
an image sensor configured to generate a real space image according to the second portion of the incident light;
a light modulator having a transmittance that is variable for each pixel according to a masking image and configured to pass at least a part of the first portion of the incident light according to the transmittance;
a control and projection image generation unit configured to generate the masking image and a projection image according to the real space image; and
a projection unit configured to receive the projection image, generate a projection image light corresponding to the projection image, and combine the projection image light with the at least a part of the first portion of the incident light transmitting the light modulator,
wherein the control and projection image generation unit selects a target object to be deleted from the real space scene, and generate the masking image based on a target object area associated with the target object so as to cause the light modulator to block a foreground of the real space scene represented by the first portion of the incident light and pass a background of the real space scene.

2. The display apparatus of claim 1, wherein the projection unit comprises:
a display configured to receive the projection image to generate the projection image light corresponding to the projection image; and
a beam combiner configured to combine the projection image light with the at least a part of the first portion of the incident light transmitting the light modulator.

3. The display apparatus of claim 1, wherein the control and projection image generation unit comprises:
a memory storing program instructions; and
a processor coupled to the memory and executing the program instructions stored in the memory,
wherein the program instructions, when executed by the processor, causes the processor to:
receive the real space image;
select a target object;
detect a target object area associated with the target object in the real space image;
generate the masking image based on the target object area so as to cause the light modulator to block the foreground of the real space scene and pass the background of the real space scene; and generate the projection image based on the real space image to provide the projection image to the projection unit.

4. The display apparatus of claim 3, wherein the program instructions causing the processor to select the target object causes the processor to automatically select the target object.

5. The display apparatus of claim 3, wherein the program instructions causing the processor to select the target object causes the processor to select the target object in response to a user input.

6. The display apparatus of claim 1, wherein the projection image is an inpainting image generated by removing the target object area from the real space image and filling pixels in the target object area with different pixel values using information on the area around the target object area.

7. The display apparatus of claim 6, wherein the program instructions causing the processor to generate the projection image comprises program instructions causing the processor to:
correct the inpainting image to reduce a distortion in a combined image.

8. The display apparatus of claim 7, wherein the program instructions causing the processor to correct the inpainting image comprises program instructions causing the processor to:
calculate the inpainting image;
apply an inverse function of nonlinear color response characteristics of the image sensor to the target object area the inpainting image;
apply an attenuation experienced by the incident light from the real space scene in an optical system of the display apparatus; and
apply an inverse function of a distortion in the projection unit to the incident light from the real space scene with the attenuation applied to obtain a corrected inpainting image.

9. A method of combining a light incident from a real space scene in front of a display apparatus with a projection image light in the display apparatus, the method comprising:
splitting the incident light from the real space scene to transmit a first portion of the incident light from the real space scene and generate a real space image according to a second portion of the incident light from the real space scene;
selecting a target object to be deleted from the real space scene and detecting a target object area associated with the target object;
generating a projection image according to the real space image;
generating the masking image based on the target object area and blocking a foreground of the real space scene represented by the first portion of the incident light in a path of the incident light from the real space scene according to the masking image while allowing a background of the real space scene to pass; and
generating a projection image light corresponding to the projection image and combining the projection image light with a part of the first portion of the incident light in which the foreground is removed.

10. The method of claim 9, wherein the projection image is an inpainting image generated by removing the target object area from the real space image and filling pixels in the target object area with different pixel values using information on the area around the target object area.

11. The method of claim 10, wherein generating projection image comprises:
correcting the inpainting image to reduce a distortion in a combined image.

12. The method of claim 11, wherein correcting the inpainting image comprises:
calculating the inpainting image;
applying an inverse function of nonlinear color response characteristics of the image sensor to the target object area the inpainting image;
applying an attenuation experienced by the incident light from the real space scene in an optical system of the display apparatus; and
applying an inverse function of a distortion in the projection unit to the incident light from the real space scene with the attenuation applied to obtain a corrected inpainting image.

13. The method of claim 9, wherein the target object is automatically selected by program instructions executed in the display apparatus.

14. The method of claim 9, wherein the target object is selected in response to a user input.

* * * * *